United States Patent
Wang et al.

(10) Patent No.: US 9,825,871 B2
(45) Date of Patent: Nov. 21, 2017

(54) SYSTEM AND METHOD FOR PROVIDING AN ON-SITE SERVICE

(71) Applicants: INSTITUTE OF ACOUSTICS, CHINESE ACADEMY OF SCIENCES, Beijing (CN); SHANGHAI 3NTV NETWORK TECHNOLOGY CO. LTD., Shanghai (CN); BEIJING HILI TECHNOLOGY CO. LTD, Beijing (CN)

(72) Inventors: Jinlin Wang, Beijing (CN); Jiali You, Beijing (CN); Haojiang Deng, Beijing (CN); Zhaolin Liu, Beijing (CN); Gang Cheng, Shenzhen (CN)

(73) Assignee: INSTITUTE OF ACOUSTICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 15/123,792

(22) PCT Filed: Jun. 30, 2014

(86) PCT No.: PCT/CN2014/081300
§ 371 (c)(1),
(2) Date: Sep. 6, 2016

(87) PCT Pub. No.: WO2015/131470
PCT Pub. Date: Sep. 11, 2015

(65) Prior Publication Data
US 2017/0019342 A1    Jan. 19, 2017

(30) Foreign Application Priority Data
Mar. 7, 2014 (CN) .......................... 2014 1 0083167

(51) Int. Cl.
*H04L 12/26* (2006.01)
*H04L 12/857* (2013.01)
(Continued)

(52) U.S. Cl.
CPC ...... *H04L 47/2491* (2013.01); *H04L 41/5025* (2013.01); *H04L 43/0852* (2013.01);
(Continued)

(58) Field of Classification Search
CPC . H04L 47/2491; H04L 67/16; H04L 43/0852; H04L 47/805; H04L 41/5025; H04L 67/1008; H04L 67/322
See application file for complete search history.

(56) References Cited

U.S. PATENT DOCUMENTS

| 9,160,571 B2 * | 10/2015 | Banerjee ............. H04L 12/6418 |
| 2012/0331147 A1 * | 12/2012 | Dutta ........................ G06F 9/06 709/226 |

FOREIGN PATENT DOCUMENTS

| CN | 103067524 A | 4/2013 |
| CN | 103347055 A | 10/2013 |
| CN | 103458052 A | 12/2013 |

OTHER PUBLICATIONS

International Search Report issued in PCT/CN2014/081300 dated Dec. 12, 2014.

* cited by examiner

*Primary Examiner* — Afshawn Towfighi
(74) *Attorney, Agent, or Firm* — Gokalp Bayramoglu

(57) ABSTRACT

A system and method for providing an on-site service includes a plurality of nodes, each containing: a neighborhood node set generation module, for generating a neighborhood node set on the basis of the bidirectional link bandwidth between a local node and a neighboring node; a neighborhood information index table generation module, (Continued)

for generating a neighborhood information index table of the local node; a candidate service point selection module, for selecting according to a selection function a candidate service node from the set of neighboring nodes; the definition of the selection function being: for a current service request, computing the difference between the QoS of the neighboring node i executing the service request and the QoS of the local node executing the service request; if the computed difference is smaller than a set threshold, the neighboring node i serving as the candidate service node; a service scheduling module, for receiving status information and feedback information provided in real time by the candidate service node, and selecting, on the basis of this information, a candidate node or the local node to serve as the service-executing node.

10 Claims, 1 Drawing Sheet

(51) Int. Cl.
    H04L 29/08        (2006.01)
    H04L 12/24        (2006.01)
    H04L 12/927       (2013.01)
(52) U.S. Cl.
    CPC ........ *H04L 47/805* (2013.01); *H04L 67/1008* (2013.01); *H04L 67/16* (2013.01); *H04L 67/322* (2013.01)

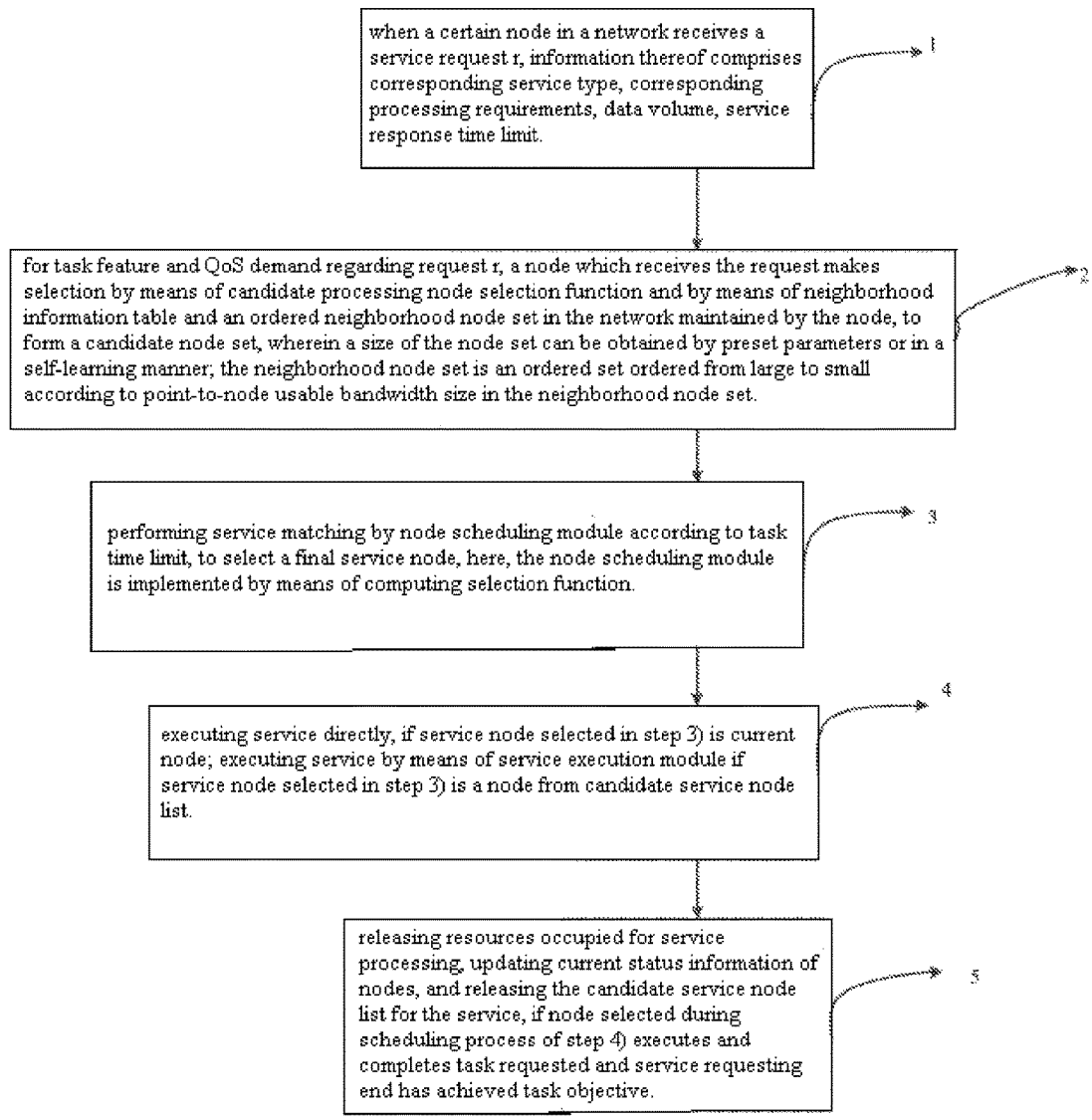

SYSTEM AND METHOD FOR PROVIDING AN ON-SITE SERVICE

TECHNICAL FIELD

The present disclosure relates to the computer network technology, and particularly to a system and method for providing an on-site service.

BACKGROUND

With increased service requirements and improved processing demand in a network, the current main solution is that a service is provided by transmitting and processing a service request in the network over the cloud and returning the processed result to a requesting end. However, as media businesses increase, larger data volume and high real-time demand thereof makes it difficult for cloud service to meet a user's requirements, leading to a low degree of satisfaction of the service quality. This is because the main contradiction between the cloud service and media processing in network lies in the following two aspects: one aspect is that the transmission delay of large-scale data over the cloud leads to the media service being incapable of providing users with high efficient processing assurance; the other aspect is that the location-independent characteristic of cloud computing leads to being incapable of meeting the processing requirement based on a location.

In an actual network, one the one hand, since cloud computing resources are usually centrally deployed in a regional way by a cloud computing service supplier, it is difficult for a user to specify a specific service node and service location, and there is a long time for transmitting data between a centrally deployed cloud server and an actual user; on the other hand, there are a substantial amount of edge serving devices and scattered network resources are unused and not applied in a reasonable way. However, these resources are not only close to users but also have a certain processing ability, there is a problem needed to be solved that how to manage and utilize reasonably service resources at edge of network.

SUMMARY OF THE DISCLOSURE

An objective of the presently described embodiments lies in improving the processing efficiency of network tasks and making full use of idle resources, thereby providing a system and method for providing an on-site service.

In order to achieve the above objectives, the described embodiments provide a system for providing an on-site system, said system comprises a plurality of nodes, and each node comprises:

a neighborhood node set generation module, used for generating a neighborhood node set on the basis of the bidirectional link bandwidth information between a local node and a neighboring node, and ordering usable bandwidths of various neighboring nodes in the set from large to small or from small to large;

a neighborhood information index table generation module, used for generating a neighborhood information index table of the local node, the neighborhood information index table is used for storing node status information of various neighboring nodes and description information of a service type provided by the nodes;

a candidate service node selection module, used for selecting according to a selection function a candidate service node from a set of neighboring nodes; wherein the definition of the selection function is: for a current service request, a difference between QoS of the neighboring node i executing the service request and the QoS of the local node executing the service request is computed; the neighboring node i is used as the candidate service node if the computed difference is smaller than a set threshold;

a service scheduling module, used for receiving status information and feedback information provided in real time by the candidate service nodes, and matching the status information and feedback information of various candidate service nodes with content in a service request command, then to select a service execution node from the candidate service nodes and the local node, wherein, the status information comprises: an idle resource status, an occupied resource status, a current resource margin, a currently hosted service type and history service information;

the feedback information comprises: quality of service, service resource consumption and service status;

the service request command comprises: content of the requested service, a type of the requested service, QoS demand of the requested service and information on a service result output destination.

Optionally, the above described node further comprises: a receiving module, used for receiving the service request command and transmitting the received service request command to the candidate service point selection module.

Optionally, the above described node further comprises:

a measurement module, used for measuring connection characteristics of network to obtain information related to network connection, and inputting the obtained information related to network connection to the neighborhood node set generation module; wherein the information related to network connection comprises the bidirectional link bandwidth information and delay information between nodes;

an information exchanging module, used for acquiring information of the neighboring nodes and inputting the acquired information of the neighboring nodes to the neighborhood information index table generation module; wherein the information of the neighboring nodes comprises: information related to network connection measured by the neighboring nodes, status information of the neighboring nodes and description information of the service types provided by the neighboring nodes.

Optionally, the above described candidate service node selection module comprises:

a first filtration submodule, used for selecting, from the neighborhood node set, a node with the service type required by the service request command or a node capable of dynamically loading the service type requested by the service request command, and composing all the selected nodes as a preliminary candidate service node set;

a second filtration submodule, used for further selecting, from the preliminary candidate service node set, a neighboring node simultaneously meeting the following two conditions as a node in a second candidate service node set:

condition one: the usable bandwidth between the neighboring node and a service receiving point is larger than the bandwidth required by the service request;

condition two: the following equation is utilized to obtain a candidate service node for the local node $p_i$:

$$F_1(\Sigma_i{}^r) = \Sigma_{i,1}{}^r = \{\zeta_j \in \Sigma_i{}^r | t_{i,j,k_r} = T(i,j,\sigma_{k_r}) + D(i,j,\psi_{k_r}) \leq \min(T(i,i,\sigma_{k_r}), t_{k_r})\}$$

the above described function $T(i,j,\sigma_{k_r})$ represents time spent if the requested service is processed on node $p_i$ after node $p_i$ receives the service request command r with a processing amount of $\sigma_{k_r}$;

the above described function $D(i,j,\psi_{k_r})$ represents the sum of time for transmitting data from node $p_i$ to execution node $p_j$ and time for transmitting a result from execution node $p_j$ to a destination after execution node $p_j$ executes and completes;

the above described function $T(i,i,\sigma_{k_r})$ represents time spent for processing the request directly by node $p_i$ after the node $p_i$ receives the service request command r with the processing amount of $\sigma_{k_r}$;

$t_{k_r}$ represents a set service response time limit;

a third service node set generation submodule, used for selecting, from the second candidate service node set, $N_{k_r}$ nodes as a candidate service node set, the specific equation thereof is as follows:

$$F_2 \Sigma_{i,1}{}^r = \Sigma_{i,2}{}^r = \{\zeta_j \epsilon \Sigma_{i,1}{}^r | \text{ selecting the first } N_{k_r} \text{ from } \Sigma_{i,1}{}^r \text{ ordered from small to large by } t_{i,j,k_r}\}$$

Optionally, the above described service scheduling module further comprises:

a status information and feedback information receiving submodule, used for receiving status information and feedback information of nodes returned by various candidate nodes in the candidate service node set, said status information comprises the idle resource status, the occupied resource status, the current resource margin, the currently hosted service type and the history service information; said feedback information comprises the quality of service, the service resource consumption and the service status; and a matching submodule, used for matching the requested service type with the service types that the local node and the candidate service nodes are capable of providing, and using one node of the candidate service nodes or the local node as a service execution node when the one node supports the requested service type and the resources of the one node is sufficient to support processing of the requested service.

In addition, the present description further provides a method for providing an on-site service which acquires the requested service based on the above described on-site service system, said method comprises:

step 101) considering node $p_i$ in a network as a service request accessing node, when the node $p_i$ receives a service request command r;

wherein said request command r comprises: a requested service type $k_r$, a processing requirement $\sigma_{k_r}$ of the requested service, a requested date volume $\psi_{k_r}$, a set time limit $t_{k_r}$ for the node to respond the service request command;

step 102) extracting service type information and QoS demand regarding a request contained in the service request command, selecting a candidate service node by a candidate service point selection module, in conjunction with a neighborhood information index table and a neighborhood node set maintained by the node $p_i$, and then to obtain a set of candidate service nodes $\Sigma_i{}^r$ with a size of $N_{i,r}$; wherein said QoS demand comprises bandwidth and delay;

step 103) selecting, according to the set time limit $t_{k_r}$ for the node to respond the service request command, a service execution node from the candidate service nodes or the local node in accordance with a selection function;

step 104) providing service directly by the current service request accessing node, if the service execution node selected in step 103) is the current service request accessing node;

transmitting the service request command to a service execution node and executing the requested service by the service execution node, if the service execution node is a node from a candidate service node list.

Optionally, transmitting the processed result to a service result output destination in the service request in one of the following ways according to information on the service result output destination, after the execution node executes and completes the requested task:

returning, by the execution node, a processing result to the service result output destination; or returning the processing result to the service request accessing node, and returning, by the service request accessing node, it back to the service result output destination; or returning the processing result to a specified node in the neighborhood node set, and returning, by the specified node, it back to the service result output destination.

Optionally, the above described size "$N_{k_r}$" of node net is obtained by preset parameters or in a self-learning manner.

Further optionally, the above described candidate service point selection module selects a candidate service node utilizing the following selection function:

$$\Sigma_i{}^r = F(\Sigma) = F_3(F_2(F_1(\Sigma)))$$

Where $$F_1(\Sigma_i{}^r) = \Sigma_{i,1}{}^r = \{\zeta_j \epsilon \Sigma_i{}^r | t_{i,j,k_r} = T(i,j,\sigma_{k_r}) + D(i,j,\psi_{k_r}) \leq \min(T(i,i,\sigma_{k_r}), t_{k_r})\}$$

$$F_2(\Sigma_{i,1}{}^r) = \Sigma_{i,2}{}^r = \{\zeta_j \epsilon \Sigma_{i,1}{}^r | \text{ selecting the first } N_{k_r} \text{ from } \Sigma_{i,1}{}^r \text{ ordered from small to large by } t_{i,j,k_r}\}$$

$$F_3(\Sigma) = \Sigma_i{}^r = \{\zeta_j \epsilon \Sigma_{i,2}{}^r | \tau_{j,k_r} - 1 \| \text{ service type } k_r \text{ loadable by } p_j\}$$

the above described $\zeta_j = \{w_j, s_{up}, s_{cur}, c_{up}, c_{cur}, v_1, \ldots, v_k, \ldots, v_M\}$, where $w_j$ represents the usable bandwidth of node $p_j$, $s_{up}$ and $s_{cur}$ represents respectively the maximum storage capacity and the currently occupied storage capacity of node $p_j$, $c_{up}$ and $c_{cur}$ represents respectively the maximum computing ability and the currently occupied computing ability of node $p_j$, $v_k$ represents the ability measurement of node $p_j$ when a service of type k is processed by the node $p_j$, M is the amount of service types that all the nodes in the neighborhood node set are capable of supporting;

the above described function $T(i,j,\sigma_{k_r})$ represents time spent if the requested service is processed on node $p_j$, after the node $p_i$ receives the service request command r with the processing amount of $\sigma_{k_r}$;

the above described function $D(i,j,\psi_{k_r})$ represents the sum of time for transmitting data from node $p_i$ to execution node $p_j$ and time for transmitting a result from execution node $p_j$ to a destination after execution node $p_j$ executes and completes.

Optionally, after said step 104), the method further comprises: step 105) releasing resources of the execution node occupied for service processing, updating current status information of the service request accessing node and the execution node, and releasing the candidate service nodes for the service request accessing node.

In a word, the selection of candidate service nodes is implemented by means of a computing selection function. The selection function is to compute, for a current service request, a difference between the QoS of executing the service request by other nodes in a network and the QoS of executing the request by a service receiving node, and the smaller the difference is, the bigger the possibility for executing the request by other nodes in place of the service receiving node is. The selection function may be computed by, but not limited to, the bidirectional link bandwidths of network, the type of the service request, computing demand of the service request, QoS demand of service, related information to network connection, and a combination of one or more thereof. The selection function may also be implemented by means of definitions or learning relevant rules. The service scheduling means that for the current service request, a suitable service execution node is selected from the service receiving node and the set of candidate service nodes. The selection process may be computed by a combination of one or more of the available status, the execution condition of historical tasks, features of queued tasks and other network features. The selection process may also be implemented by means of definitions or learning rules.

As compared with the prior art, the advantage of the present embodiments lies in that:

the present embodiments may detect and maintain information on network edge node close to a service request, dynamically and flexibly construct a computing service network, and provide high efficient on-site services for processing requests with low-delay service requirements, thereby meeting the increasing network processing demand and providing a new distributed network processing system. The technical solution provided herein not only improves resource utilization, but also may provide a high efficient service for network processing requirements with low-delay demands.

BRIEF DESCRIPTION OF THE DRAWINGS

FIG. 1 is a flow diagram of a method for flexibly and autonomously processing a on-site service implemented on a flexible and autonomous on-site service system.

DETAILED DESCRIPTION

The present inventions will be described below in detail through the accompanying drawings and embodiments.

Embodiments

It is supposed that, a network contains N nodes, a set of which $P=\{p_1, \ldots, p_i, \ldots, P_N\}$, a corresponding set of attributes of network nodes $\Sigma=\{\zeta_1, \zeta_2, \ldots, \zeta_N\}$. Each $\zeta_i$ ($1 \leq i \leq N$) maintains related information to node $p_i$ in real time, $\zeta_j=\{w_i, s_{up}, s_{cur}, c_{up}, c_{cur}, v_1, \ldots, v_k, \ldots, v_M\}$, where $w_i$ represents usable bandwidth of node $p_j$, $s_{up}$ and $s_{cur}$ represents respectively a maximum storage capacity and currently occupied storage capacity of the node, $c_{up}$ and $c_{cur}$ represents respectively a maximum computing ability and currently occupied computing ability of the node, $v_k$ represents a ability measurement of node $p_i$, when a service of type k is processed by node $p_i$, M is the total amount of all service types that all the nodes in a service node set can implement. $\tau_{i,k}$ represents whether node $p_i$ has the service ability of the service type k required by a current request, where $$\tau_{i,k} = \begin{cases} 1 & \text{node } p_i \text{ can execute the service type } k \\ 0 & \text{node } p_i \text{ can not execute the service type } k \end{cases}.$$

Step 1), considering a certain node $p_i$ in the network as a service request accessing node when the node $p_i$ receives a service request command information r;

wherein the request command information r comprises: the requested service type $k_r$, processing requirements of requested service, requested data volume $\psi_{k_r}$, time limit $t_{k_r}$ for a node to respond to a service request command.

Step 2) selecting a candidate processing node from all neighboring nodes of node $p_i$ by a selection function, according to a task feature and QoS demand regarding the service request command r, on the basis of a neighborhood information index table and a neighborhood node set in the network maintained by node $p_i$, thus to form a candidate service node set $\Sigma_i^r$ with a size of $N_{i,r}$;

optionally, the above described size of node set "$N_{k_r}$" may be obtained by preset parameters or in a self-learning manner, and the neighborhood node set is an ordered set ordered from large to small according to point-to-node $p_i$ usable bandwidth size in the neighborhood node set.

Optionally, the above described selection function is described as follows:

$$\Sigma_i^r = F(\Sigma) = F_3(F_2(F_1(\Sigma)))$$

where $$F_1(\Sigma_i^r) = \Sigma_{i,1}^r = \{\zeta_j \in \Sigma_i^r | t_{i,j,k_r} = T(i,j,\sigma_{k_r}) + D(i,j,\psi_{k_r}) \leq \min(T(i,i,\sigma_{k_r}), t_{k_r})\}$$

$$F_2(\Sigma_{i,1}^r) = \Sigma_{i,2}^r = \{\zeta_j \in \Sigma_{i,1}^r | \text{ selecting the first } N_{k_r} \text{ from } \Sigma_{i,1}^r \text{ ordered from small to large by } t_{i,j,k_r}\}$$

$$F_3(\Sigma) = \Sigma_i^r = \{\zeta_j \in \Sigma_{i,2}^r | \tau_{j,k_r} - 1 \| \text{ service type } k_r \text{ loadable by } p_j\}$$

where the function $T(i,j,\sigma_{k_r})$ represents time spent if task r with a processing amount of $\sigma_{k_r}$ is processed on node $p_j$, after node $p_i$ receives the task r, the time includes queue waiting time.

$D(i,j,\psi_{k_r})$ represents time required for migrating a service by utilizing the usable bandwidth between node $p_i$ and node $p_j$ and returning a service result to a service result output destination, which is related to network bidirectional bandwidths, the total amount of data before and after processed, a service providing point and the service result output destination. If this time is small enough, the node belongs to the candidate service node set.

Step 3) matching by a scheduling module, according to a set time limit $t_{k_r}$ for a node to respond to a service request command, a service request with services which the candidate service nodes are capable of providing, to select a final service execution node; the scheduling module is implemented by a computing selection function, which may be implemented by utilizing: an random selection manner, a certain distribution selection, a combination selection of one or more parameter(s) or a customized selection function. Which selection function to choose belongs to the common knowledge in the art, thus no details thereof will be given here.

Step 4), providing service directly by the current service request accessing node, if the service node selected in step 103) is the current service request accessing node; processing procedure of a node from a candidate service node list is as follows, if the execution node is the node from a candidate service node list:

the service request accessing node transmits, according to the execution node selected by the scheduling module, control information and data required for service processing to the execution node, and the requested service is executed by the node. After the selected execution node executes and completes the requested task, the processed result is transmitted to an output destination in one of the following ways according to information on a service result output destination in the service request:

1) returning, by the execution node, the processing result to the service result output destination; 2) returning the processing result to the service request accessing node, and then returning, by the service request accessing node, it back to the service result output destination;

3) returning the processing result to a specified node in the neighborhood node set, and then returning, by the specified node, it back to the service result output destination.

Step 5), releasing resources occupied for service processing, updating current status information of nodes and releasing the candidate service nodes for the service request accessing node, if the node selected in step 4) executes and completes the requested task and the service requesting end has achieved the task objective.

In addition, the present embodiments further provide a non-volatile computer readable medium with computer readable instructions stored thereon which, upon executed by one or more processors, cause the one or more processors to perform the following steps:

step 101) considering node $p_i$ in a network as a service request accessing node, when the node $p_i$ receives a service request command r;

wherein, the request command r comprises: a requested service type $k_r$, processing requirements $\sigma_{k_r}$ of the requested service, a requested date volume $\psi_{k_r}$, a time limit $t_{k_r}$ for the node to respond the service request command;

step 102) extracting service type information and QoS demand regarding a request contained in the service request command, selecting by means of a candidate service point selection module a candidate service node, in conjunction with a neighborhood information index table and a neighborhood node set maintained by the node $p_i$, and then to obtain a set of candidate service nodes $\Sigma_i^r$ with a size of $N_{i,r}$;

step 103) matching by a scheduling module, according to the set time limit $t_{k_r}$ for the node to respond the service request command, the service request with services which the candidate service nodes are capable of providing, to select a final service execution node;

step 104) providing service directly by the current service request accessing node, if the service node selected in step 103) is the current service request accessing node;

transmitting the service request command to the execution node and executing the requested service by the execution node, if the execution node is a node from a candidate service node list.

Optionally, the above described candidate service point selection module selects a candidate service node utilizing the following selection function:

$$\Sigma_i^r = F(\Sigma) = F_3(F_2(F_1(\Sigma)))$$

where $$F_1(\Sigma_i^r) = \Sigma_{i,1}^r = \{\zeta_j \in \Sigma_i^r | t_{i,j,k_r} = T(i,j,\sigma_{k_r}) + D(i,j,\psi_{k_r}) \leq \min(T(i,i,\sigma_{k_r}), t_{k_r})\}$$

$$F_2(\Sigma_{i,1}^r) = \Sigma_{i,2}^r = \{\zeta_j \in \Sigma_{i,1}^r | \text{ selecting the first } N_{k_r} \text{ from } \Sigma_{i,1}^r \text{ ordered from small to large by } t_{i,j,k_r}\}$$

$$F_3(\Sigma) = \Sigma_i^r = \{\zeta_j \in \Sigma_{i,2}^r | \tau_{j,k_r} - 1 \| \text{ service type } k_r \text{ loadable by } p_j\}$$

the above described $\zeta_j = \{w_i, s_{up}, s_{cur}, c_{up}, c_{cur}, v_1, \ldots, v_k, \ldots, v_M\}$, where $w_j$ represents the usable bandwidth of node $p_j$, $s_{up}$ and $s_{cur}$ represents respectively the maximum storage capacity and the currently occupied storage capacity of node $p_j$, $c_{up}$ and $c_{cur}$ represents respectively the maximum computing ability and the currently occupied computing ability of node $p_j$, $v_k$ represents the ability measurement of node $p_j$ when a service of type k is processed by the node $p_j$, M is the total amount of all service types which all the nodes in the neighborhood node set are capable of implementing;

the above described function $T(i,j,\sigma_{k_r})$ represents the time spent if the requested service is processed on node $p_j$, after node $p_i$ receives the service request command r with a processing amount of $\sigma_{k_r}$;

the above described function $D(i,j,\psi_{k_r})$ represents the time required for returning a service result to a service result output destination by utilizing the usable bandwidth between the service request accessing node $p_i$ and any node $p_j$ in neighborhood node set thereof.

Further optionally, after the above described step 104), the following step is further included:

step 105) releasing resources of the execution node occupied for service processing, updating current status information of the service request accessing node and the execution node, and releasing the candidate service nodes for the service request accessing node.

In a word, an objective of the technical solution provided in the present description lies in solving problems of network task efficient processing and nearby services, thereby providing a computing method through which the service node scope is flexible and adjustable, the service resource area is dynamic and autonomous, and the service provider is close to a source originating a request. With the above described embodiments, information on network edge node close to a service request may be detected and maintained to dynamically and flexibly construct a computing service network, high efficient on-site services may be provided to processing requests with low-delay service requirements, thereby meeting the increasing network processing demand and providing a new distributed network processing system.

Finally, it should be explained that the aforementioned embodiments are merely used for illustrating, rather than limiting the technical solutions of the present claims. Although described in detail with reference to the embodiments, those skilled in the art will understand that modifications or equivalent substitutions can be made to the technical solutions without departing from the scope and spirit of the technical solutions, and thereby should all be encompassed within the scope of the claims.

What is claimed is:

1. A system for providing an on-site service, wherein the system comprises a plurality of nodes, and each node comprises:

a neighborhood node set generation module, used for generating a neighborhood node set on the basis of the bidirectional link bandwidth information between a local node and a neighboring node, and ordering usable bandwidths of various neighboring nodes in the set from large to small or from small to large;

a neighborhood information index table generation module, used for generating a neighborhood information index table of the local node, the neighborhood information index table is used for storing node status information of various neighboring nodes and description information of a service type provided by the nodes;

a candidate service node selection module, used for selecting according to a selection function a candidate service node from a set of neighboring nodes; wherein the definition of the selection function is: for a current service request, a difference between QoS of the neighboring node i executing the service request and the QoS of the local node executing the service request is computed; the neighboring node i is used as the candidate service node if the computed difference is smaller than a set threshold;

a service scheduling module, used for receiving status information and feedback information provided in real time by the candidate service nodes, and matching the status information and feedback information of various candidate service nodes with content in a service request command, then to select a service execution node from the candidate service nodes and the local node;

wherein, the status information comprises: an idle resource status, an occupied resource status, a current resource margin, a currently hosted service type and history service information;

the feedback information comprises: quality of service, service resource consumption and service status;

the service request command comprises: content of the requested service, a type of the requested service, QoS demand of the requested service and information on a service result output destination.

2. The system for providing an on-site service according to claim 1, wherein said node further comprises: a receiving module, used for receiving the service request command and transmitting the received service request command to the candidate service point selection module.

3. The system for providing an on-site service according to claim 1, wherein said node further comprises:

a measurement module, used for measuring connection characteristics of network to obtain information related to network connection, and inputting the obtained information related to network connection to the neighborhood node set generation module; wherein the information related to network connection comprises the bidirectional link bandwidth information and delay information between nodes;

an information exchanging module, used for acquiring information of the neighboring nodes and inputting the acquired information of the neighboring nodes to the neighborhood information index table generation module; wherein the information of the neighboring nodes comprises: information related to network connection measured by the neighboring nodes, status information of the neighboring nodes and description information of the service types provided by the neighboring nodes.

4. The system for providing an on-site service according to claim 1, wherein the candidate service node selection module comprises:

a first filtration submodule, used for selecting, from the neighborhood node set, a node with the service type required by the service request command or a node capable of dynamically loading the service type requested by the service request command, and composing all the selected nodes as a preliminary candidate service node set;

a second filtration submodule, used for further selecting, from the preliminary candidate service node set, a neighboring node simultaneously meeting the following two conditions as a node in a second candidate service node set:

condition one: the usable bandwidth between the neighboring node and a service receiving point is larger than the bandwidth required by the service request;

condition two: the following equation is utilized to obtain a candidate service node for the local node $p_i$:)

$$F_1(\Sigma_i^r) = \Sigma_{i,1}^r = \{\zeta_j \in \Sigma_i^r | t_{i,j,k_r} = T(i,j,\sigma_{k_r}) + D(i,j,\psi_{k_r}) \leq \min_{(i,i,\sigma_{k_r}),t_{k_r})}(T$$

the above described function $T(i,j,\sigma_{k_r})$ represents time spent if the requested service is processed on node $p_j$ after node $p_i$ receives the service request command r with a processing amount of $\sigma_{k_r}$;

the above described function $D(i,j,\psi_{k_r})$ represents the sum of time for transmitting data from node $p_i$ to execution node $p_j$ and time for transmitting a result from execution node $p_j$ to a destination after execution node $p_j$ executes and completes;

the above described function $T(i,i,\sigma_{k_r})$ represents time spent for processing the request directly by node $p_i$ after the node $p_i$ receives the service request command r with the processing amount of $\sigma_{k_r}$;

$t_{k_r}$ represents a set service response time limit;

a third service node set generation submodule, used for selecting, from the second candidate service node set, $N_{k_r}$ nodes as a candidate service node set, the specific equation thereof is as follows:

$$F_2\Sigma_{i,1}^r = \Sigma_{i,2}^r = \{\zeta_j \in \Sigma_{i,1}^r | \text{ selecting the first } N_{k_r} \text{ from } \Sigma_{i,1}^r \text{ ordered from small to large by } t_{i,j,k_r}\}$$

5. The system for providing an on-site service according to claim 1, wherein said service scheduling module further comprises:

a status information and feedback information receiving submodule, used for receiving status information and feedback information of nodes returned by various candidate nodes in the candidate service node set, said status information comprises the idle resource status, the occupied resource status, the current resource margin, the currently hosted service type and the history service information; said feedback information comprises the quality of service, the service resource consumption and the service status; and a matching submodule, used for matching the requested service type with the service types that the local node and the candidate service nodes are capable of providing, and using one node of the candidate service nodes or the local node as a service execution node when the one node supports the requested service type and the resources of the one node is sufficient to support processing of the requested service.

6. A method for providing an on-site service which acquires the requested service, implemented in a system for providing an on-site service, wherein the system comprises a plurality of nodes, and each node comprises: a neighborhood node set generation module, used for generating a neighborhood node set on the basis of the bidirectional link bandwidth information between a local node and a neighboring node, and ordering usable bandwidths of various neighboring nodes in the set from large to small or from small to large; a neighborhood information index table generation module, used for generating a neighborhood information index table of the local node, the neighborhood information index table is used for storing node status information of various neighboring nodes and description information of a service type provided by the nodes; a candidate service node selection module, used for selecting according to a selection function a candidate service node from a set of neighboring nodes; wherein the definition of the selection function is: for a current service request, a difference between QoS of the neighboring node i executing the service request and the QoS of the local node executing the service request is computed; the neighboring node i is used as the candidate service node if the computed difference is smaller than a set threshold; a service scheduling module, used for receiving status information and feedback information provided in real time by the candidate service nodes, and matching the status information and feedback information of various candidate service nodes with content in a service request command, then to select a service execution node from the candidate service nodes and the local node; wherein, the status information comprises: an idle resource status, an occupied resource status, a current resource margin, a currently hosted service type and history service information; the feedback information comprises: quality of service, service resource consumption and service status; the service request command comprises: content of the requested service, a type of the requested service, QoS demand of the requested service and information on a service result output destination, the method comprises:

- step 101) considering node $p_i$ in a network as a service request accessing node, when the node $p_i$ receives a service request command r,
- wherein, said request command r comprises: a requested service type $k_r$, a processing requirement $\sigma_{k_r}$ of the requested service, a requested date volume $\psi_{k_r}$, a set time limit $t_{k_r}$ for the node to respond the service request command;
- step 102) extracting service type information and QoS demand regarding a request contained in the service request command, selecting a candidate service node by a candidate service point selection module, in conjunction with a neighborhood information index table and a neighborhood node set maintained by the node $p_i$, and then to obtain a set of candidate service nodes $\Sigma_i^r$ with a size of $N_{i,r}$; wherein said QoS demand comprises bandwidth and delay;
- step 103) selecting, according to the set time limit $t_{k_r}$ for the node to respond the service request command, a service execution node from the candidate service nodes or the local node in accordance with a selection function;
- step 104) providing service directly by the current service request accessing node, if the service execution node selected in step 103) is the current service request accessing node;
- transmitting the service request command to a service execution node and executing the requested service by the service execution node, if the service execution node is a node from a candidate service node list.

7. The method for providing an on-site service according to claim 6, wherein,
- transmitting the processed result to a service result output destination in the service request in one of the following ways according to information on the service result output destination, after the execution node executes and completes the requested task:
  - returning, by the execution node, a processing result to the service result output destination; or
  - returning the processing result to the service request accessing node, and returning, by the service request accessing node, it back to the service result output destination; or
  - returning the processing result to a specified node in the neighborhood node set, and returning, by the specified node, it back to the service result output destination.

8. The method for providing an on-site service according to claim 6, wherein the size "$N_{k_r}$" of node net is obtained by preset parameters or in a self-learning manner.

9. The method for providing an on-site service according to claim 6, wherein the candidate service point selection module selects a candidate service node utilizing the following selection function:

$$\Sigma_i^r = F(\Sigma) = F_3(F_2(F_1(\Sigma)))$$

where $$F_1(\Sigma_i^r) = \Sigma_{i,1}^r = \{\zeta_j \in \Sigma_i^r | t_{i,j,k_r} = T(i,j,\sigma_{k_r}) + D(i,j,\psi_{k_r}) \leq \min(T(i,i,\sigma_{k_r}), t_{k_r})\}$$

$$F_2(\Sigma_{i,1}^r) = \Sigma_{i,2}^r = \{\zeta_j \in \Sigma_{i,1}^r | \text{ selecting the first } N_{k_r} \text{ from } \Sigma_{i,1}^r \text{ ordered from small to large by } t_{i,j,k_r}\}$$

$$F_3(\Sigma) = \Sigma_i^r = \{\zeta_j \in \Sigma_{i,2}^r | \tau_{j,k_r} = 1 \| \text{ service type } k_r \text{ loadable by } p_j\}$$

the above described $\zeta_j = \{w_i, s_{up}, s_{cur}, c_{up}, c_{cur}, v_1, \ldots, v_k, \ldots, v_M\}$, where $w_j$ represents the usable bandwidth of node $p_j$, $s_{up}$ and $s_{cur}$ represents respectively the maximum storage capacity and the currently occupied storage capacity of node $p_j$, $c_{up}$ and $c_{cur}$ represents respectively the maximum computing ability and the currently occupied computing ability of node $p_j$, $v_k$ represents the ability measurement of node $p_j$ when a service of type k is processed by the node $p_j$, M is the amount of service types that all the nodes in the neighborhood node set are capable of supporting;

the above described function $T(i,j,\sigma_{k_r})$ represents time spent if the requested service is processed on node $p_j$, after node $p_i$ receives the service request command r with the processing amount of $\sigma_{k_r}$;

the above described function $D(i,j,\psi_{k_r})$ represents the sum of time for transmitting data from node $p_i$ to execution node $p_j$ and time for transmitting a result from execution node $p_j$ to a destination after execution node $p_j$ executes and completes.

10. The method for providing an on-site service according to claim 6, wherein after said step 104), the method further comprises:
- step 105) releasing resources of the execution node occupied for service processing, updating current status information of the service request accessing node and the execution node, and releasing the candidate service nodes for the service request accessing node.

* * * * *